United States Patent
Chahal et al.

(10) Patent No.: US 11,387,850 B2
(45) Date of Patent: Jul. 12, 2022

(54) SYSTEMS AND METHODS FOR A MULTIBAND SENSING PLATFORM

(71) Applicant: Board of Trustees of Michigan State University, East Lansing, MI (US)

(72) Inventors: Premjeet Chahal, Okemos, MI (US); Deepak Kumar, East Lansing, MI (US); Saikat Mondal, East Lansing, MI (US); Saranraj Karuppuswami, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 442 days.

(21) Appl. No.: 16/695,758

(22) Filed: Nov. 26, 2019

(65) Prior Publication Data

US 2020/0169275 A1 May 28, 2020

Related U.S. Application Data

(60) Provisional application No. 62/771,763, filed on Nov. 27, 2018.

(51) Int. Cl.
*H04B 1/00* (2006.01)
*H04B 11/00* (2006.01)
*H04B 7/22* (2006.01)

(52) U.S. Cl.
CPC .......... *H04B 1/005* (2013.01); *H04B 7/22* (2013.01); *H04B 11/00* (2013.01)

(58) Field of Classification Search
CPC .......... H04B 1/005; H04B 7/22; H04B 11/00; H04B 13/005; H04B 1/0064
See application file for complete search history.

(56) References Cited

U.S. PATENT DOCUMENTS

| | | | |
|---|---|---|---|
| 9,455,769 B2 | 9/2016 | Tedjini et al. | |
| 10,929,620 B2 * | 2/2021 | Chahal | G06K 19/07309 |
| 11,228,326 B2 * | 1/2022 | Kang | H03F 3/211 |
| 2017/0098149 A1 | 4/2017 | Kesler et al. | |
| 2019/0362110 A1 * | 11/2019 | Chahal | G06K 7/10297 |
| 2020/0169275 A1 * | 5/2020 | Chahal | H04B 1/0064 |

* cited by examiner

*Primary Examiner* — Daniel Pihulic
(74) *Attorney, Agent, or Firm* — Harness, Dickey & Pierce, P.L.C.

(57) ABSTRACT

A multiband sensing system includes an active multiband sensing unit configured to transmit a radio frequency (RF) signal in multiple bands and communicate with a network. The active multiband sensing unit includes at least one transmitting antenna configured to transmit the RF signal. The multiband sensing system includes a passive multiband sensing unit including at least one receiving antenna configured to receive the RF signal, an acoustic actuator powered by the received RF signal including an actuating sensor element configured to actuate in response to receiving extracted modulated information of the RF signal, and an acoustic detector. The acoustic detector includes a detector transmitting antenna configured to backscatter a new frequency band signal to the active multiband sensing unit and a detector sensor element configured to sense data. The sensed data is modulated over the received RF signal to produce the new frequency band signal.

20 Claims, 5 Drawing Sheets

SYSTEMS AND METHODS FOR A MULTIBAND SENSING PLATFORM

CROSS REFERENCE

This application claims the benefit of U.S. Provisional Application 62/771,763, filed Nov. 27, 2018. The entire disclosure of the above application is incorporated herein by reference.

FIELD

The present disclosure relates to a wireless sensing system, in particular, uplinking and downlinking at different frequencies to transmit and receive information with improved bandwidth and signal to noise ratio as well as increased data rate for actuation and detection of sensors or transducers in active or passive mode.

BACKGROUND

Wireless communication is a well-established platform used for information transfer between multiple sources and nodes. The information is modulated over a radio frequency (RF) signal for inter-node communication or for source-node communication. Without loss of generality, any form of wireless communication system (mobile, satellite, radar, etc.) is a sensing system including a transducer that converts information from one form to other, modulates the information over a carrier electromagnetic wave, and transmits the information to another node or source. For example, in mobile communication, a phone acts as a transducer converting voice information to digital information and transmits it to a cell phone tower. More specifically, RF sensing methods such as Radio frequency identification (RFID), Electronic article surveillance (EAS) techniques modulates the sensor data over the electromagnetic waves and transmits the information to a RF reader (conventional or handheld) allowing data acquisition.

Traditionally, wireless communication methods use a single frequency band for both uplink and downlink communication (WiFi, Bluetooth, Zigbee, LoraWan, RFID, etc.) or multiple frequency channels within the same frequency band (mobile communication). More specifically, RFID sensing systems operating at a single frequency band is limited by bandwidth, data rate, and range. For example, RFID system coupled with single or multiple parameter sensing requires more bandwidth and data rate to transmit sensing data along with the identification information. Furthermore, RFID operates only in half-duplex mode, requiring twice the communication time of a full-duplex configuration, reducing efficiency. Moreover, single frequency band operations are prone to self-jamming, multi-path interference, and poor clutter rejection due to a lower signal to noise ratio limiting the range of the system.

Wireless RF sensing offers significant advantages such as low cost, real-time, field-operable, and allows non-invasive, non-contact monitoring of different target parameters that are present in an inaccessible or closed environment and not in a direct line of sight. Sensing units are commonly used in monitoring multiple targets wirelessly in various fields such as agriculture, biomedical, civil and environmental, automation, aerospace, defense etc. For example, active wireless acoustic actuation and detection systems are commonly used in non-invasive condition monitoring and predictive maintenance applications for machines, buildings, bridges, other objects or any media that allows propagation of mechanical waves. However, the current active wireless sensor systems are limited by bandwidth and data rate due to their single band operation.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A multiband sensing system includes an active multiband sensing unit configured to transmit a radio frequency (RF) signal in multiple bands and communicate with a network. The active multiband sensing unit includes at least one transmitting antenna configured to transmit the RF signal. The multiband sensing system includes a passive multiband sensing unit including at least one receiving antenna configured to receive the RF signal, an acoustic actuator powered by the received RF signal including an actuating sensor element configured to actuate in response to receiving extracted modulated information of the RF signal, and an acoustic detector. The acoustic detector includes a detector transmitting antenna configured to backscatter a new frequency band signal to the active multiband sensing unit and a detector sensor element configured to sense data. The sensed data is modulated over the received RF signal to produce the new frequency band signal.

In other aspects, the actuating sensor element actuates the detector sensor element to sense data and the detector sensor element is configured to sense temperature, humidity, pressure, moisture, volatiles, pH, viscosity, dielectric, or vibrations. In other aspects, the actuating sensor element is a transducer and, in response to actuating, generates vibrations and the sensed data is a vibration value. In other aspects, the at least one transmitting antenna is configured to transmit the RF signal at a first frequency band. The first frequency band is different from a new frequency band of the new frequency band signal.

In other aspects, the active multiband sensing unit includes a controller, an RF source, and a modulator. The modulator is configured to receive information for transmission from the controller, receive the RF signal from the RF source, and modulate the information for transmission over the RF signal. In other aspects, the information includes identification information corresponding to active multiband sensing unit. In other aspects, the RF source is powered by a power source. In other aspects, the RF source can generate a continuous wave at a single frequency.

In other aspects, the passive multiband sensing unit includes a controller configured to instruct the actuating sensor element to produce a vibration and receive the sensed data from the detector sensor element. In other aspects, the passive multiband sensing unit includes a demodulator configured to extract information from the received RF signal to power the controller, the actuating sensor element, and the detector sensor element through rectification. In other aspects, the actuating sensor element and the detector sensor element are affixed to a surface at a distance apart.

A multiband sensing method includes receiving, from a network, a request signal at a first frequency. The request signal includes information modulated over a carrier signal. The method includes demodulating the request signal to extract the information and, based on the information, actuating a sensor element using the request signal to sense a first environment value. The method includes generating a transmit signal by modulating the extracted information and the first environment value over a re-transmit signal. The re-transmit signal is in a re-transmit frequency band different from a carrier frequency band of the carrier signal. The method includes transmitting the transmit signal to the network.

In other aspects, actuating the sensor element using the request signal includes powering an acoustic actuator using the request signal and detecting, by the sensor element, the first environment value in response to the acoustic actuator being powered. In other aspects, in response to being powered, the acoustic actuator generates a vibration signal. In other aspects, the acoustic actuator and the sensor element are affixed to a surface, and the sensor element measures a vibration at a location of the sensor element caused by the vibration signal.

In other aspects, the acoustic actuator is a transducer. In other aspects, the information includes an instruction to actuate the sensor element or power an acoustic actuator and identification information. In other aspects, the method includes generating the request signal by obtaining the information for transmission, receiving the carrier signal from a signal generator, and modulating the carrier signal based on the information. In other aspects, the network demodulates the transmit signal to recover the first environment value and the information. In other aspects, the sensor element measures temperature, humidity, pressure, moisture, volatiles, pH, viscosity, dielectric, or vibration.

A multiband sensing system includes an active multiband sensing unit including an active transmitting antenna configured to transmit a request signal. The request signal is within a first frequency band. The active multiband sensing unit includes an active modulator configured to modulate information over the request signal and an active receiving antenna configured to receive signals. The multiband sensing system includes a passive multiband sensing unit including a passive receiving antenna configured to receive the request signal and a demodulator configured to demodulate the request signal to extract the information and power. The passive multiband sensing unit includes a sensing element configured to sense a value of an environment condition. The sensing element is activated using the extracted power in response to the information indicating a first passive identifier of the passive multiband sensing unit. The passive multiband sensing unit includes a passive modulator configured to modulate the value over the request signal to produce a new frequency band signal and a passive transmitting antenna configured to transmit the new frequency band signal to the active multiband sensing unit.

An active multiband sensing system operates in a full-duplex communication mode (transmitting and receiving information simultaneously) or half-duplex communication mode (transmitting and receiving information sequentially). The system operates with different uplink and downlink frequency bands. A frequency band is a portion of radio spectrum; for example, in the U.S., the FCC has approved ISM bands for different applications such as UHF RFID communication using 902-928 MHz band.

In various implementations, the system may operate in more than one frequency bands during uplink or downlink communication. For example, the system can uplink with two frequency bands 902-928 MHz and 2.4-2.5 GHz and downlink with a single frequency band 5.725-5.875 GHz. The system may include two or more active transceiver multiband units to transmit and receive information. In various implementations, the active transceiver unit includes an RF source, any form of RF source that can generate single or multiple frequencies that are continuous or pulsed, such as a signal generator and any form of resonance circuit (e.g., single or multiple antennas, inductive coils, etc.) to radiate the signal. The active transceiver unit may also include an RF receiver that may include any form of resonance circuits (e.g., single or multiple antennas, inductive coils, etc.) to receive the multiband signal and an analyzer, such as a scalar or vector network analyzer, spectrum analyzer, oscilloscope, impedance analyzer or any form of RF reader that can analyze single or multiple frequencies that are continuous or pulsed.

The active transceiver unit may also include a modulator. The modulator may be implemented as circuit including, for example, diodes, transistors, mixers, or other non-linear devices to modulate analog or digital information over one or more carrier signals by modifying amplitude, phase, frequency, etc. The active transceiver unit may also include a demodulator implemented as a detector circuit including, for example, diodes, transistors, mixers, resonators, or other non-linear devices. The active transceiver unit may also include a controller unit. In various implementations, the controller unit is a processor capable of performing logical actions (query, read, write, etc.) such as a microcontroller, a microprocessor, or other integrated chip implementations. For example, a memory may be associated with the controller unit for storing a set of processor-executable instructions performed by the controller unit. The active transceiver unit may also include a sensing unit including a single or multiple sensors and/or transducers.

In various implementations, sensors are devices that convert a monitoring parameter (analog or digital) into information operating either in active or passive mode. For example, a sensor may be configured to monitor a change in an electrical parameter, such as inductance, capacitance, resistance, voltage, current, etc. Additional monitoring parameters may include temperature, humidity, pressure, moisture, volatiles, pH, viscosity, dielectric etc. In various implementations, transducers are devices that can actuate or detect by transforming one form of energy into another. For example, a transducer may convert mechanical energy into electrical and vice versa. Example transducers may include piezo electric materials, microphone, speaker, etc.

A passive multiband sensing system may include at least one active transceiver unit as explained above along with at least one passive transceiver units. A passive transceiver unit may include a multiband RF receiver. In various implementations, the multiband RF receiver may be a resonance circuit, such as an antenna, an inductive coil, etc., operating at the frequency bands of interest. The passive multiband sensing system may also include a demodulator as described above. The passive multiband sensing system may also include a controller unit as explained also explained above. The passive multiband sensing system further includes sensors and/or transducers as described above.

In various implementations, the passive multiband sensing system includes a multiband re-transmitter or backscatterer including a mixing circuitry that may include non-linear devices that transform received uplink frequency bands into different downlink frequency bands. For example, the multiband receiver may receive the uplink signals at 902-928 MHz and 2.4-2.5 GHz frequency bands. The mixing circuitry may passively mix or transform the signal and generate the downlink frequency band at 5.725-5.875 GHz. The multiband re-transmitter may also include a modulator for modulating the information onto the downlink frequency band. The multiband re-transmitter may further include a resonance circuit including, for example, antennas, inductive coils, etc., for re-radiating the information.

In another aspect, the present disclosure relates to passive actuation and detection of transducers using the passive multiband system explained above. For passive actuation to occur, an activation signal to energize the transducer into an actuation mode. The activation signal may be a frequency waveform that is demodulated from the multiband RF receiver. For passive detection to occur, a signal generated by the transducer modulates the backscattered signal for re-radiation in detection mode.

In another aspect, the present disclosure relates to passive activation and detection of sensors using the passive multiband system explained above. The passive response from the sensor is received in response to an activation signal reading the response from the sensor. The sensor information is modulated over the backscattered signal for re-radiation in detection mode. The sensor can be any form of resonator with inductor, capacitor, or resistor and combinations thereof in wired or wireless configuration.

The disclosed system is applicable in a plethora of applications in multiple fields including aerospace, agriculture, energy, health care, transportation, etc., and in various applications including the Internet of things (IoT), artificial intelligence (AI), non-destruction evaluation (NDE), structural health monitoring (SHM), quality control, supply chain, and logistics, etc.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
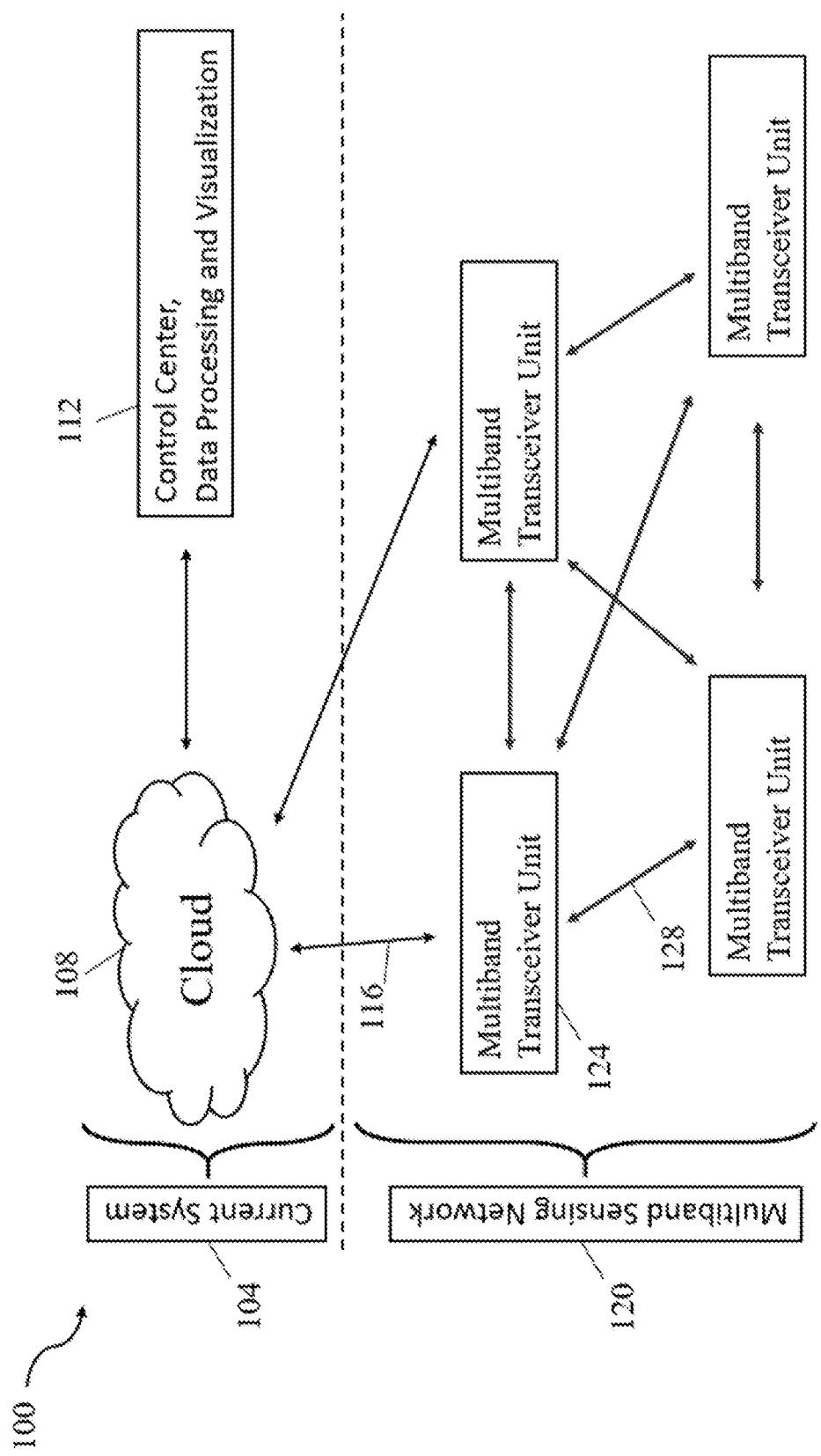
FIG. 1 is an example implementation of a multiband sensing network using the disclosed multiband transceivers.

A multiband communication system for sensing may be implemented as (i) an active multiband sensing system, (ii) a passive multiband sensing system, and (iii) a mechanism for passive actuation and detection of a transducer. The multiband system implements different uplink and downlink frequency bands, whereas, current communication systems use the same frequency band for both uplink and downlink. The disclosed method uses the FCC approved ISM frequency bands for communication. The system can operate in full-duplex or half-duplex mode depending on the needs of the application. In various implementation, the multiband system may include two or more transceiver units for transmitting and receiving information.

Additionally, the multiband system may use active or passive transceiver configurations. In an active configuration, the transceivers include an active power source that can store energy, like a battery, for multiple operations, such as signal generation, activating the associated electronics, reading the sensor data, and re-transmitting the modulated information. In a passive configuration, the transceivers operate based on the power received from an incoming RF signal to actuate/detect and re-transmit the sensor information. In various implementations, the multiband system may transmit to and receive from resonant structures that operate in single or multiple frequency bands for inter-transceiver communication.

The multiband system may include demodulation units for extracting information or actuating signals to perform different controller actions, such as reading a specific sensor node and/or actuating a transducer node. The multiband system may also include modulators to transmit the information obtained by executing the pre-defined commands and/or the identification information of the current node to the next transceiver. The multiband system may also include multiple sensors or transducers that are part of the sensing unit of the transceiver. The sensors or transducers can be selectively activated to perform sensing by the controller unit. The sensors are configured to monitor a target parameter and the sensing information is read by the controller. The transducers convert a respective form of energy into electrical information. The information is read and modulated over the re-transmitted signal by the controller. Along with the sensor information, the controller also sends identification information that corresponds to either a single sensor node or to a particular transceiver unit.

For example, the sensor may be an acoustic transducer that is actuated by a signal from the transceiver's controller. In response to receiving the controller signal, the acoustic transducer produces a vibration across an object to which it is affixed. Then, the detector transducer affixed at a certain distance from the acoustic transducer on the object receives the vibration information, converts the vibration information into an electrical signal, and feeds the electrical signal into the controller unit for re-transmission.

Referring to FIG. 1, an example implementation of a multiband sensing system architectural network 100 is shown. The current or present system 104 is connected to a cloud 108, a present single band communication 116, and a control center 112 that process and/or visualizes the data. In comparison, a multiband sensing network 120 is compatible with the current system 104 for transmitting and receiving information to and from the cloud 108. The multiband sensing network 120 may include two or more multiband transceiver units 124 communicating using a multiband communication link 128.

In various implementations, the multiband communication link 128 may be at least two frequency bands. In various implementations, the frequency bands are approved by the regulatory authority based on the geography. The multiband communication link 128 may be half-duplex, full-duplex, or a combination of both. For example, the uplink and downlink between nodes can be at two different frequency bands, for example, 902-928 MHz and 5.745-5.845 GHz, or in three different frequency bands, 433.5-434.79 MHz, 902-928 MHz, and 2.42.5 GHz. Furthermore, the uplink and downlink for the first node to the second node can be half-duplex whereas from the second node to the third node can be full-duplex. In various implementations, the multiband transceiver unit 124 can be active and/or passive. The multiband communication link 128 can be fully passive or fully active or a combination of both based on the nature of the multiband transceiver unit 124.

Figure 2:
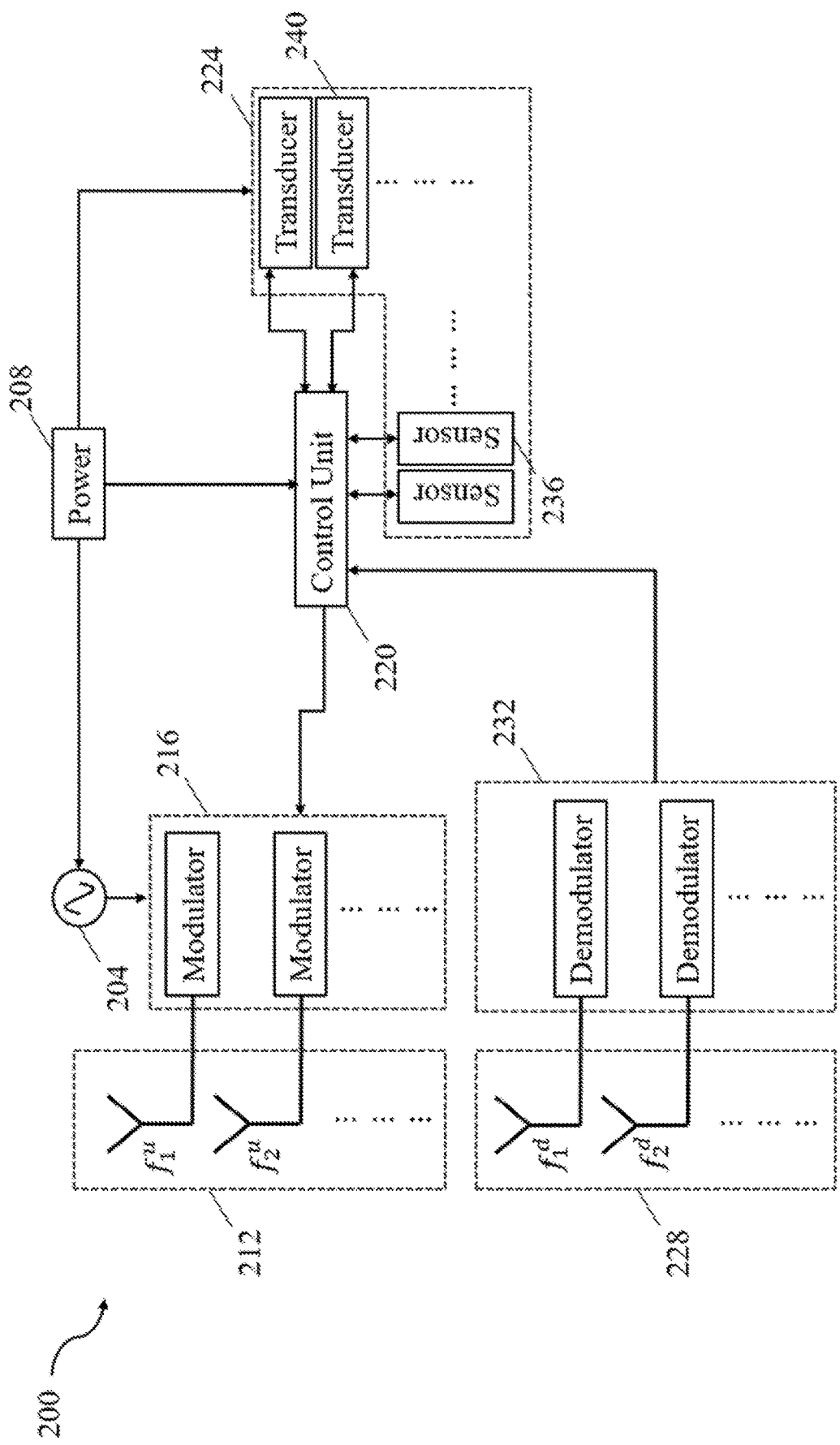
FIG. 2 is an example implementation of an active multiband sensing system.

Referring to FIG. 2, an example implementation of multiband active transceiver unit 200 is presented. The multiband active transceiver unit 200 includes an RF source 204 configured to generate one or more frequency signals for modulating the information from the controller 220. The frequency signals can be at single frequency or multiple frequencies and can be continuous or pulsed and combinations thereof. For example, the RF source 204 can generate a continuous wave at a single frequency, for example, 915 MHz, for feeding into a modulation units 216. The RF source 204 can be any form of signal generator that is activated by a power source 208. For example, the RF source 204 can be an oscillator or resonator and the power source 208 can be any form of stored energy, such as battery.

In various implementations, the multiband active transceiver unit 200 includes first RF resonators 212 for transmission and second RF resonators 228 for reception. The first RF resonators 212 and the second RF resonators 228 can be any form of near-field or far-field resonant structures. The resonant structures can resonate at single frequency or multiple frequencies. In various implementations, the resonant structures can operate in a single frequency band or multiple frequency band (wide band or narrow band). In additional implementations, the first RF resonators 212 and the second RF resonators 228 can be combined as a single resonant structure and can be used for both uplink and downlink. For example, the resonant structure in the first RF resonators 212 can be an antenna that operates in the 5.745-5.845 GHz band and the second RF resonators 228 can be an inductive coil operating at 915 MHz.

In various implementations, the multiband active transceiver unit 200 may include one or more modulation units 216 with non-linear circuits. The modulation units 216 can be a frequency, phase, and/or amplitude modulation and the combinations thereof. For example, the modulation units 216 receive the information from the controller 220 and the carrier signal from the RF source 204. The modulation units 216 modulate the information over the carrier signal for wireless transmission through the first RF resonators 212.

The modulation units 216 may include a frequency modulation mixer with dual frequency input. As shown in FIG. 2, $f_c$ is the carrier frequency generated by the RF source 204 at 5.815 GHz and $f_i$ is the information from the controller 220 that contains the sensing data or identification information. The information $f_i$ is modulated over the carrier frequency $f_c$ and is wirelessly transmitted through first RF resonators 212 operating at the carrier frequency $f_c$.

In various implementations, the multiband active transceiver unit 200 may include one or more demodulation units 232 with non-linear circuits. The demodulation units 232 demodulate the information received by the second RF resonators 228 and feed the information into the controller 220. For example, the demodulation units 232 can be an envelope detector that extracts the information from the amplitude modulated carrier signal received at the second RF resonators 228 and feeds the information into the controller 220.

In various implementations, the multiband active transceiver unit 200 may include the controller 220 to perform logical actions such as query, read, and write. For example, the controller 220 can be a microcontroller that receives the information from the demodulation units 232. The controller 220 can process the information and provide the relevant activation signals to a sensing unit 224. The controller 220 also reads the sensing information from the sensing unit 224 and feed it into the modulation unit 216. The controller 220 acquire the power for operation from the RF source 204.

In various implementations, the multiband active transceiver unit 200 may include the sensing unit 224 with single or multiple sensors 236 and/or transducers 240 for monitoring different target parameters. The sensing unit 224 may be active and/or passive and the active sensors or transducers derive the power from the RF source 204 for operation. The sensors 236 and the transducers 240 may monitor single or multiple target parameters and feeds the information into the controller 220. For example, the sensing unit 224 may include a temperature sensor that monitors the ambient temperature and an acoustic transducer that monitors the vibration of the object onto which the multiband active transceiver unit 200 is affixed. The sensors 236 and the transducers 240 feed the information into the controller 220 continuously, intermittently, or on reception of a read signal from the controller 220.

Figure 3:
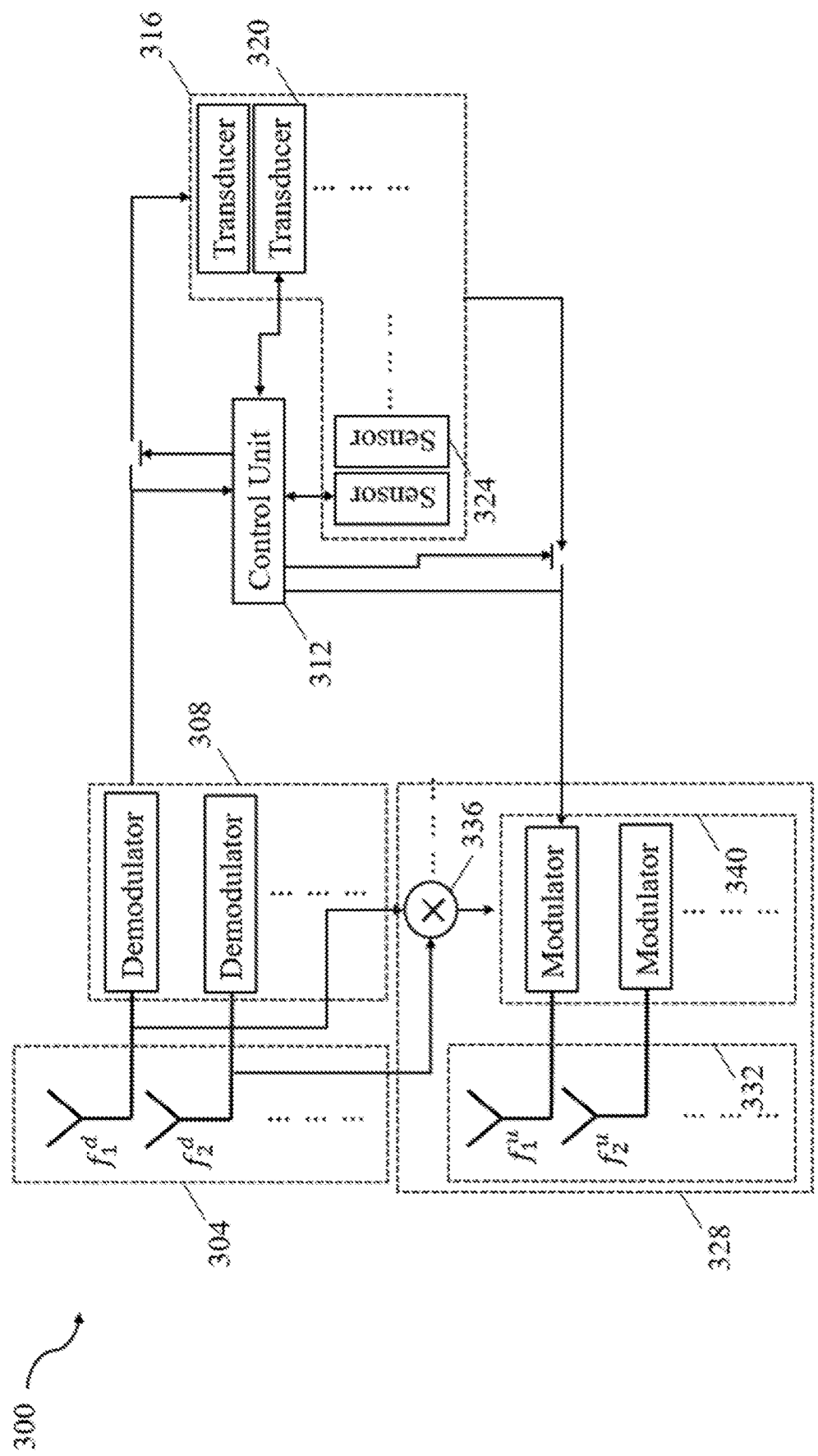
FIG. 3 is an example implementation of a passive multiband sensing system.

Referring to FIG. 3, an example implementation of a multiband passive transceiver unit 300 is presented. The multiband passive transceiver unit 300 excludes the reception of energy from an external power or a stored energy source for operation. The multiband passive transceiver unit 300 may operate as a stand-alone system using the RF power received from other nodes. The multiband passive transceiver unit 300 may include first RF resonators 304 for reception and second RF resonators 332 for re-transmission operating at a single or multiple frequency bands. In various implementations, the first RF resonators 304 and the second RF resonators 332 may include one or multiple RF resonators. Similar to the first and second resonators 212 and 228 of FIG. 2, the first RF resonators 304 and the second RF resonators 332 can be any form of near-field or far-field resonant structure that receives and re-transmits information.

In various implementations, the multiband passive transceiver unit 300 may include a demodulator 308 that demodulates the information from the first RF resonators 304. The demodulator 308 can be any non-linear device similar to the demodulation units 232 with additional functionality of RF rectification for activating the controller 312. For example, the first RF resonators 304 can have two antennas operating at 902-928 MHz and 2.4-2.5 GHz band feeding into the demodulator 308 for retrieving the information and generating DC power through rectification which is fed into the controller 312.

In various implementations, the multiband passive transceiver unit 300 may include the controller 312 configured to perform different logical actions, such as read, write, and query similar to the controller 220 of FIG. 2, including an associated memory. The activation DC signal as well as the information signal is fed into the controller 312 from the output of the demodulator 308. The controller 312 activates a sensing unit 316. The controller 312 feeds the digitally received sensing and/or identification information to a multiband re-transmitter or backscatterer unit 328 for re-transmission. For example, the controller 312 can be an ultra-low power logic circuit that feeds the actuation signal from the demodulator 308 to the transducer 320. The controller 312 also feeds the identification information and any digital read out from the sensors 324 to the multiband re-transmitter 328 for re-transmission.

In various implementations, the sensing unit 316 includes single or multiple passive analog sensors 324 or transducers 320 that monitor a variety of target parameters. The sensors 324 can be either analog or digital while the transducers 320 are analog. The sensors 324 or transducers 320 are activated or actuated directly from the demodulation signal received by the controller 312 from the demodulator 308. The analog information from the sensors 324 or transducers 320 and the identification information are fed directly into the multiband re-transmitter 328 through the controller 312. In various implementations, the sensing unit 316 includes multiple digital sensors 324 that are queried by the controller 312. The sensors 324 feed the digital sensing information back into the controller 312, and the controller 312 feeds the digital sensing information and the identification information into the multiband re-transmitter 328 for re-transmission.

For example, the sensing unit 316 may include two sensors and one transducer. The two sensors are a digital sensor for temperature and an analog sensor for humidity. The one transducer is an analog transducer for vibration actuation/detection. The transducer receives the query from the controller 312 and feeds the sensor information back into the controller 312. The transducer receives the activation signal from the controller 312 for reading the sensing information as well as a control signal from the controller 312 for feeding the sensing information to the multiband re-transmitter 328. The transducer receives the actuation/detection signal from the controller 312 for transmitting/reading the vibration information as well as a control signal for feeding the information to 328.

In various implementations, the multiband passive transceiver unit 300 includes the multiband re-transmitter 328, which modulates the information from the controller 312 and the sensing unit 316 and re-transmits the modulated information. The multiband re-transmitter 328 may include the second RF resonators 332, a non-linear circuit based mixer with associated electronics 336, and a modulator 340. For example, the second RF resonators 332 can be a transmitting antenna operating at a 5.745-5.845 GHz. The non-linear circuit based mixer with associated electronics 336 can be a non-linear device that receives two input frequency signals, $f_1$ at 915 MHz and $f_2$ at 2.45 GHz, from the first RF resonators 304 and generates a sum, a difference, harmonics, and harmonics of the sum and the difference. The associated electronics of the non-linear circuit based mixer with associated electronics 336 may have additional mixers and filters to feed the preselected carrier frequency, $f_c$, at 5.815 GHz ($2f_2+f_1$) into the modulator 340. The modulator 340 can be any non-linear device that modulates the information received from the controller 312 and/or the sensing unit 316 onto the carrier frequency for re-transmission through the second RF resonators 332.

Figure 4:
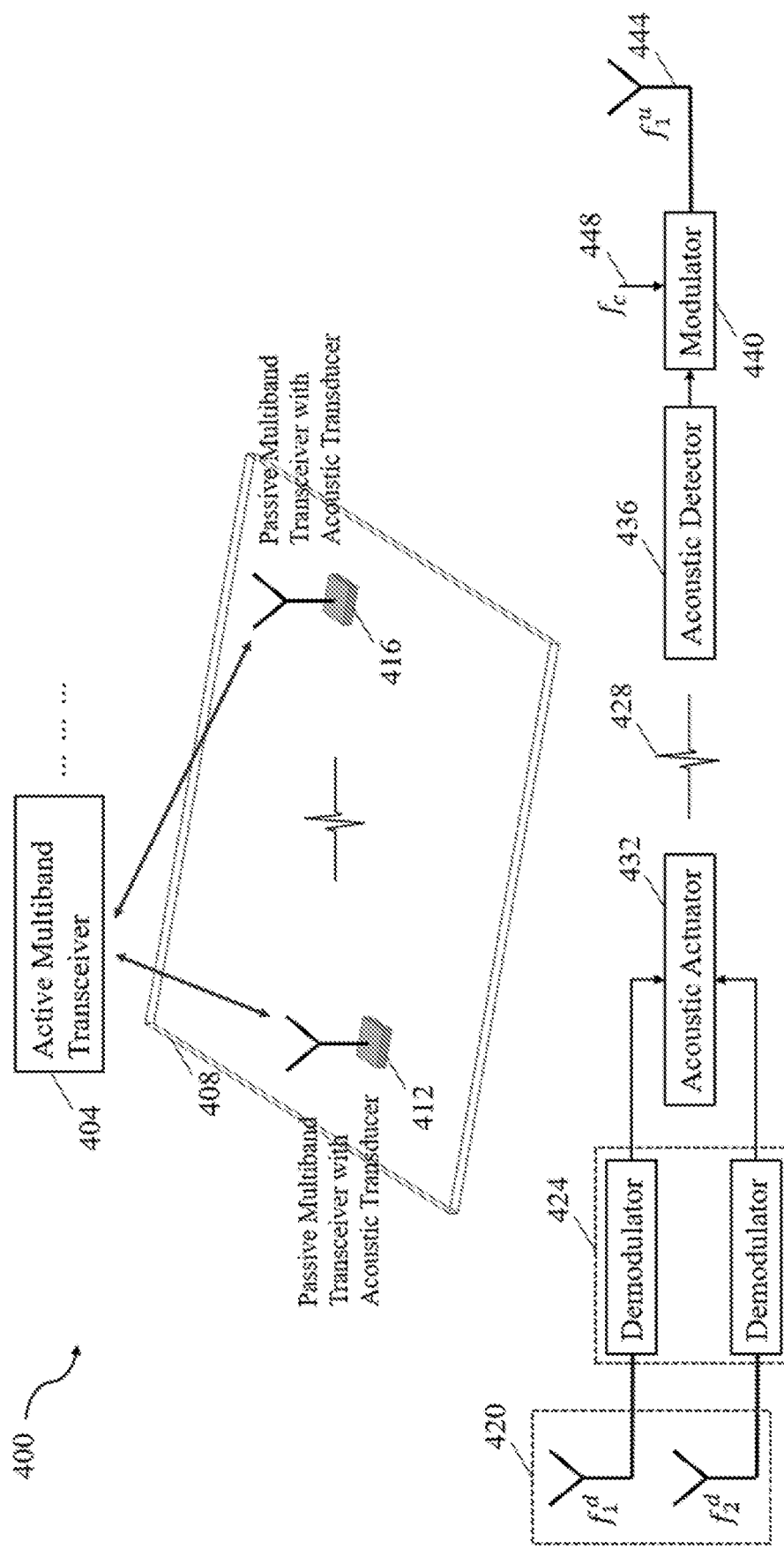
FIG. 4 is an example implementation of a passive actuation and detection of transducer.

Referring to FIG. 4, an example implementation of a method for passive actuation and detection of an acoustic transducer 400 for vibration sensing application is presented. The acoustic transducer 400 includes a single active multiband transceiver unit 200 that is configured as an interrogator 404 to actuate as well as detect the vibration information from the passive transceiver nodes. The interrogator 404 may have two different downlink frequencies 915 MHz and 2.45 GHz. An actuation analog signal is modulated onto either of the downlink frequency signals for activating the acoustic transducer. The modulated signals are transmitted to a first passive transceiver node 412 and a second passive transceiver node 416 affixed onto a surface 408.

In various implementations, the acoustic transducer 400 includes at least two passive multiband transceiver units (e.g., the first passive transceiver node 412 and the second passive transceiver node 416) that are configured with acoustic transducers for passive vibration sensing. For example, the first passive transceiver node 412 is configured in actuation mode and the second passive transceiver node 416 is configured in detection mode.

In actuation mode, the first passive transceiver node 412 receives the modulated signals transmitted from the interrogator 404 by RF resonators 420 and demodulates the actuation signal (can be an envelope of any frequency signal and the choice of frequency depends on the natural resonance of the piezo electric material) for actuating the transducer using a demodulation unit 424.

A first acoustic transducer 432 in actuation mode and a second acoustic transducer 436 in detection mode may be made from any type of piezoelectric crystals including quartz, berlinite, sucrose, Rochelle salt, topaz, Tourmaline group minerals, lead titanate, etc.; synthetic crystals such as Langasite, Gallium orthophosphate, Lithium niobate, Lithium tantalite, etc.; synthetic ceramics such as Barium titanate, Lead zirconate titanate, lead zirconate titanate, Potassium niobate, Sodium tungstate, Zinc oxide, etc.; Lead free ceramics such as Sodium potassium niobate, Bismuth ferrite, Sodium niobate, Barium titanate, Bismuth titanate, Sodium bismuth titanate, etc.; and polymers such as polyvinylfiouride (PVDF) and combinations thereof. Vibration signals 428 are generated onto the affixed surface 408 based on the actuation signal.

In detection mode, the second passive transceiver node 416 receives the signals from the interrogator 404 and filters out the actuation signal using filters (filters are devices that selectively blocks or allows certain frequencies or bands and can be band-stop, band-pass, low-pass, high-pass and combinations thereof) and mixers generating the carrier signal ($f_c$) 448 for modulation. For example, the signals from the interrogator 404 are $f_1$ 915 MHz and $f_2$ 2.45 GHz, and the carrier signal 448 $f_c$ 5.815 GHz is generated by mixing these two signals ($2f_2+f_1$).

The second passive transceiver node 416 may be implemented as the second acoustic transducer 436 similar to the first acoustic transducer 432 that receives the vibration signal 428 from the first acoustic transducer 432 and modulates the analog vibration signal onto the carrier signal 448 and re-transmits back to the interrogator 404 through a detection antenna 444 for detection.

Figure 5:
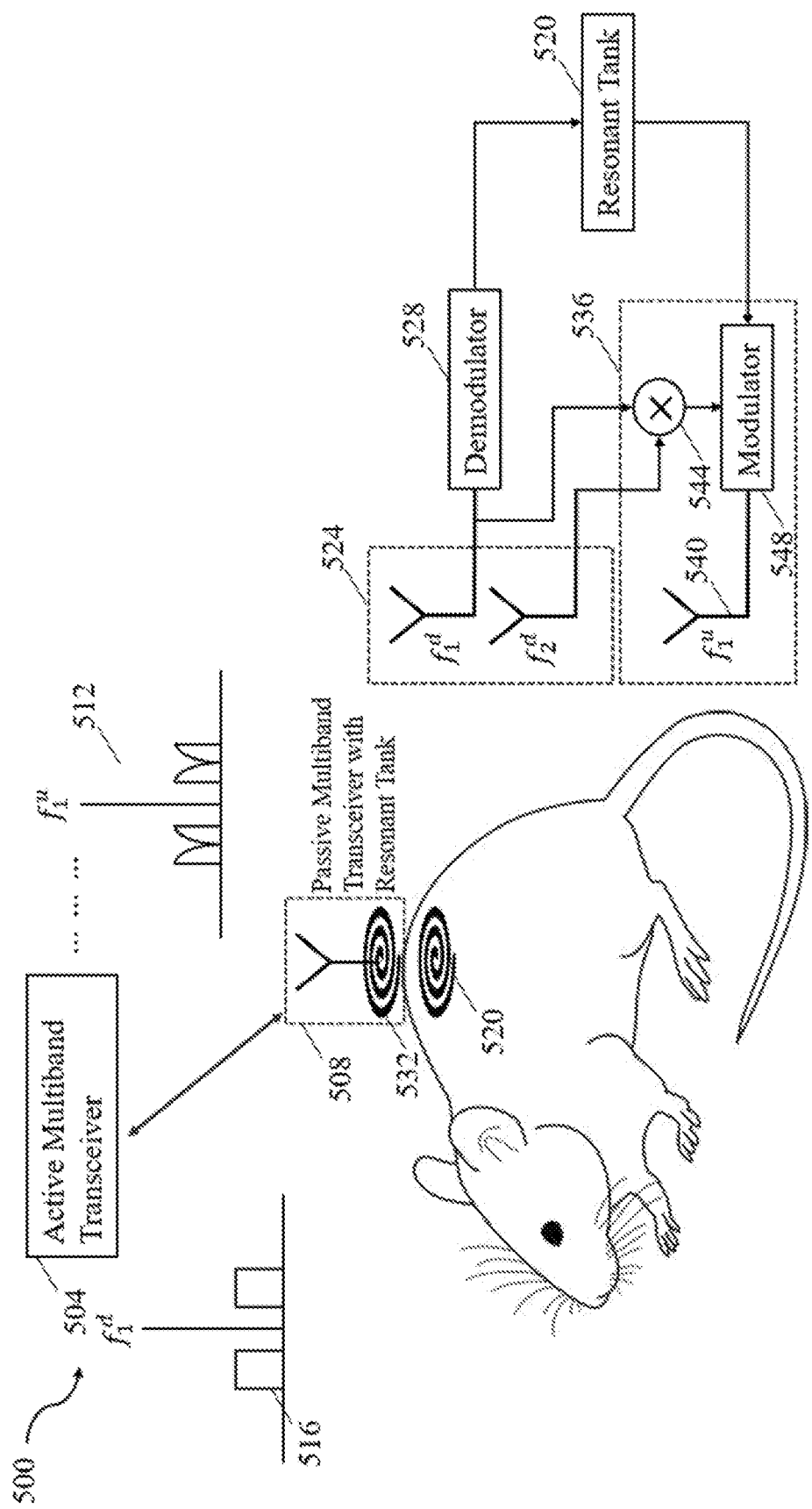
FIG. 5 is an example implementation of a passive activation and detection of sensor.

Referring to FIG. 5, an example implementation of a method for passive activation and detection of an implantable sensor system 500 is presented. The implantable sensor system 500 may include a single active multiband transceiver unit that is configured as an interrogator 504 to activate as well as detect an implantable sensor 520. A passive multiband transceiver unit is configured as an interface unit 508 to transmit the information from the implantable sensor 520 to the interrogator 504. The interrogator 504 includes two different downlink frequencies $f_1^d$ 915 MHz and $f_2^d$ 2.45 GHz. An activation signal 516 rides as an information on the side bands and is modulated onto either of the downlink frequencies. The modulated signals from the interrogator 504 are transmitted to the interface unit 508 for activating the implanted sensor 520.

The interface unit 508 may include transmit RF resonators 524 and receive RF resonators 540 for transmitting and receiving information. The transmit RF resonators 524 may be two receiving antennas operating at 915 MHz and 2.45 GHz, and the receive RF resonators 540 may be a single transmitting antenna operating at 5.815 GHz.

In various implementations, the interface unit 508 includes a demodulator 528 to extract the side bands or the activation signal from the downlink frequency. The activation signal is fed into a reading coil 532 for extracting the information from the implantable sensor 520. The implantable sensor 520 may be a resonator whose resonance changes with the change in monitoring parameter. In various implementations, the signal from the implantable sensor 520 is read by the reading coil 532 and is fed into a re-transmitter/backscatterer unit 536. The re-transmitter/backscatterer unit 536 includes a mixer circuitry 544 that uses the incoming signals from 524 to generate the carrier frequency for a modulation unit 548. The modulation unit 548 modulates the information from the reading coil 532 over the carrier signal generated from the mixer circuitry 544 and transmits a modulated signal 512 to the interrogator 504 through the receive RF resonators 540 with an uplink frequency $f_1''$ of 5.815 GHz.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multiband sensing system comprising:
   an active multiband sensing unit configured to:
      transmit a radio frequency (RF) signal in multiple bands; and
      communicate with a network,
      wherein the active multiband sensing unit includes at least one transmitting antenna configured to transmit the RF signal; and
   a passive multiband sensing unit including:
      at least one receiving antenna configured to receive the RF signal;
      an acoustic actuator powered by the received RF signal including an actuating sensor element configured to actuate in response to receiving extracted modulated information of the RF signal; and
      an acoustic detector including:
         a detector transmitting antenna configured to backscatter a new frequency band signal to the active multiband sensing unit; and
         a detector sensor element configured to sense data, wherein the sensed data is modulated over the received RF signal to produce the new frequency band signal.

2. The multiband sensing system of claim 1 wherein the actuating sensor element actuates the detector sensor element to sense data, and wherein the detector sensor element is configured to sense temperature, humidity, pressure, moisture, volatiles, pH, viscosity, dielectric, or vibrations.

3. The multiband sensing system of claim 1 wherein the actuating sensor element is a transducer and, in response to actuating, generates vibrations, and wherein the sensed data is a vibration value.

4. The multiband sensing system of claim 1 wherein the at least one transmitting antenna is configured to transmit the RF signal at a first frequency band, and wherein the first frequency band is different from a new frequency band of the new frequency band signal.

5. The multiband sensing system of claim 1 wherein the active multiband sensing unit includes:
   a controller;
   an RF source; and
   a modulator configured to:
      receive information for transmission from the controller;
      receive the RF signal from the RF source; and
      modulate the information for transmission over the RF signal.

6. The multiband sensing system of claim 5 wherein the information includes identification information corresponding to active multiband sensing unit.

7. The multiband sensing system of claim 5 wherein the RF source is powered by a power source.

8. The multiband sensing system of claim 5 wherein the RF source can generate a continuous wave at a single frequency.

9. The multiband sensing system of claim 1 wherein the passive multiband sensing unit includes:
   a controller configured to:
      instruct the actuating sensor element to produce a vibration; and
      receive the sensed data from the detector sensor element; and
   a demodulator configured to extract information from the received RF signal to power the controller, the actuating sensor element, and the detector sensor element through rectification.

10. The multiband sensing system of claim 1 wherein the actuating sensor element and the detector sensor element are affixed to a surface at a distance apart.

11. A multiband sensing method comprising:
    receiving, from a network, a request signal at a first frequency, wherein the request signal includes information modulated over a carrier signal;
    demodulating the request signal to extract the information;
    based on the information, actuating a sensor element using the request signal to sense a first environment value;
    generating a transmit signal by modulating the extracted information and the first environment value over a re-transmit signal, wherein the re-transmit signal is in a re-transmit frequency band different from a carrier frequency band of the carrier signal; and
    transmitting the transmit signal to the network.

12. The method of claim 11 wherein actuating the sensor element using the request signal includes:
    powering an acoustic actuator using the request signal; and
    detecting, by the sensor element, the first environment value in response to the acoustic actuator being powered.

13. The multiband sensing method of claim 12 wherein, in response to being powered, the acoustic actuator generates a vibration signal.

14. The multiband sensing method of claim 13 wherein:
    the acoustic actuator and the sensor element are affixed to a surface, and
    the sensor element measures a vibration at a location of the sensor element caused by the vibration signal.

15. The multiband sensing method of claim 14 wherein the acoustic actuator is a transducer.

16. The multiband sensing method of claim 11 wherein the information includes:
    an instruction to actuate the sensor element or power an acoustic actuator, and
    identification information.

17. The multiband sensing method of claim 11 further comprising:

generating the request signal by:
obtaining the information for transmission;
receiving the carrier signal from a signal generator; and
modulating the carrier signal based on the information.

18. The multiband sensing method of claim 11 wherein the network demodulates the transmit signal to recover the first environment value and the information.

19. The multiband sensing method of claim 11 wherein the sensor element measures temperature, humidity, pressure, moisture, volatiles, pH, viscosity, dielectric, or vibration.

20. A multiband sensing system comprising:
an active multiband sensing unit including:
an active transmitting antenna configured to transmit a request signal, wherein the request signal is within a first frequency band;
an active modulator configured to modulate information over the request signal; and
an active receiving antenna configured to receive signals; and
a passive multiband sensing unit including:
a passive receiving antenna configured to receive the request signal;
a demodulator configured to demodulate the request signal to extract the information and power;
a sensing element configured to sense a value of an environment condition, wherein the sensing element is activated using the extracted power in response to the information indicating a first passive identifier of the passive multiband sensing unit;
a passive modulator configured to modulate the value over the request signal to produce a new frequency band signal; and
a passive transmitting antenna configured to transmit the new frequency band signal to the active multiband sensing unit.

* * * * *